United States Patent
Stevenson et al.

[11] Patent Number: 5,820,115
[45] Date of Patent: Oct. 13, 1998

[54] FILM SLIPPER BUSHING ASSEMBLY

[75] Inventors: James F. Stevenson, Hudson; Jeffry D. Cotton, Akron, both of Ohio

[73] Assignee: BTR Antivibration Systems, Inc., Ft. Wayne, Ind.

[21] Appl. No.: 489,886

[22] Filed: Jun. 13, 1995

[51] Int. Cl.⁶ .................................................. F16B 1/00
[52] U.S. Cl. ...................... 267/293; 384/222; 403/226; 267/141.3; 267/141.4; 267/271
[58] Field of Search .................. 267/292–294, 267/141.2–141.5, 141.7, 153, 270, 279, 280, 281; 384/220, 222, 296, 297, 908; 403/224–226, 228

[56] References Cited

U.S. PATENT DOCUMENTS

| | | | |
|---|---|---|---|
| 1,827,233 | 10/1931 | Hughes | 267/271 |
| 1,827,267 | 10/1931 | Short | 267/271 |
| 2,032,697 | 3/1936 | Golden | 280/106.5 |
| 2,238,197 | 4/1941 | Watson | 384/222 |
| 2,305,795 | 12/1942 | Heinrich | 280/96.2 |
| 2,340,503 | 12/1944 | Barenyi | 384/222 |
| 3,139,311 | 6/1964 | Melton et al. | 384/220 |
| 3,194,614 | 7/1965 | Thomas | 384/222 |
| 3,608,927 | 9/1971 | Grosseau | 280/124 |
| 3,801,209 | 4/1974 | Matsuoka | 403/225 |
| 4,139,246 | 2/1979 | Mikoshiba et al. | 384/222 |
| 4,192,529 | 3/1980 | Shiratori et al. | 280/689 |
| 4,316,643 | 2/1982 | Burk et al. | 308/26 |
| 4,623,164 | 11/1986 | Cassel et al. | 280/689 |
| 4,671,694 | 6/1987 | Brenner et al. | 403/228 |
| 4,693,457 | 9/1987 | Kamata | 267/153 |
| 4,700,796 | 10/1987 | Morlok et al. | 180/88 |
| 4,744,677 | 5/1988 | Tauaka et al. | 384/222 |
| 4,761,083 | 8/1988 | Smith et al. | 384/220 |
| 4,809,960 | 3/1989 | Kakimoto et al. | 267/281 |
| 4,854,766 | 8/1989 | Hein | 403/224 |
| 4,884,790 | 12/1989 | Castrilli | 267/281 |
| 4,951,962 | 8/1990 | Tomida et al. | 280/689 |
| 5,035,681 | 7/1991 | Hertel et al. | 384/297 |
| 5,058,867 | 10/1991 | Hadauo et al. | 403/226 |
| 5,076,605 | 12/1991 | Umeda | 280/689 |
| 5,080,334 | 1/1992 | Mihara et al. | 267/153 |
| 5,102,160 | 4/1992 | Stowe | 280/689 |
| 5,118,070 | 6/1992 | Reid | 248/635 |
| 5,139,244 | 8/1992 | Chakko | 267/293 |
| 5,183,137 | 2/1993 | Siwek et al. | 188/381 |
| 5,224,790 | 7/1993 | Hein | 403/225 |
| 5,257,680 | 11/1993 | Corcoran et al. | 188/129 |
| 5,286,014 | 2/1994 | Chakko | 267/293 |
| 5,431,500 | 7/1995 | Harris et al. | 384/206 |
| 5,439,203 | 8/1995 | Hadauo | 267/146.12 |
| 5,515,949 | 5/1996 | Baumgartner et al. | 188/72.9 |

FOREIGN PATENT DOCUMENTS

| | | |
|---|---|---|
| 1405936 | 2/1969 | Germany . |
| 348327 | 5/1931 | United Kingdom . |
| 671811 | 5/1952 | United Kingdom . |
| 805928 | 12/1958 | United Kingdom . |
| 1295485 | 11/1972 | United Kingdom . |

Primary Examiner—Robert J. Oberleitner
Assistant Examiner—Chris Schwartz
Attorney, Agent, or Firm—Wood, Herron & Evans

[57] ABSTRACT

A slipper bushing assembly including a series of concentric members for permitting controlled sliding movement between a support element and a movable element. The concentric members of the slipper bushing assembly include a rigid one piece inner metal member joined to the support element, a hollow cylindrical elastomeric member, a rigid, one piece hollow outer metal member, a solid slip surface and structure for preventing the inner metal member from disengaging from the outer metal member. The inner metal member has a pair of opposing ends and an outer cylindrical-like surface. The elastomeric member encircles the outer surface of the inner metal member and has a pair of opposing ends, an outer surface and an inner surface. The outer metal member is joined to the movable element and has a pair of opposing ends and an outer cylindrical surface. The slip surface is contiguous to the inner or outer surface of the elastomeric member and coextensive therewith.

2 Claims, 3 Drawing Sheets

FILM SLIPPER BUSHING ASSEMBLY

FIELD OF THE INVENTION

This invention relates to a film slipper bushing assembly. More particularly, this invention relates to a film slipper bushing assembly including a series of concentric members for permitting controlled sliding movement between a support element and a movable element.

BACKGROUND OF THE INVENTION

A bushing is typically comprised of inner and outer concentric metal sleeves having a rubber insert or other elastomeric, cylindrical body disposed between the two sleeves. In a typical bushing application the outer metal sleeve is joined to a movable member and the inner metal sleeve is joined to a support element. The bushing is designed so as to permit controlled movement between the joined parts.

One typical application of a bushing is in the upper and lower, both front and rear, control arms of automotive suspension systems. In certain applications with large angular rotations the bushing design commonly used is referred to as a slipper bushing. The bushings are used where relative movement between the parts joined by the bushing is not only desirable but necessary. For a detailed description of various bushing designs and the manner of operation reference is made to U.S. Pat. Nos. 5,286,014; 5,139,244; 4,316,643 and 3,801,209, incorporated herein by reference.

Although the many known bushing designs have been proven to perform satisfactorily, further improvements in bushing designs are desired.

Accordingly, it is an object of the present invention to provide a slipper bushing including a series of concentric members for permitting controlled sliding movement between a support element and a movable element. Another object of the present invention is to significantly reduce material and assembly costs of slipper bushings by reducing the number of components, allowing the use of conventional tooling and inexpensive readily available commercial materials. It is a further object of the present invention to provide a slipper bushing which does not contain liquids which may leak. Yet another object of the present invention to provide a film slipper bushing that is simple and economical to manufacture.

SUMMARY OF THE INVENTION

Briefly, according to this invention there is provided a slipper bushing assembly including a series of concentric members for permitting controlled sliding movement between a support element and a movable element. The concentric members of the slipper bushing assembly include a rigid one piece inner metal member joined to the support element, a hollow cylindrical elastomeric member, a rigid, one piece hollow outer metal member, a solid slip surface and means for preventing the inner metal member from disengaging from the outer metal member. The inner metal member has a pair of opposing ends and an outer cylindrical-like surface. The elastomeric member encircles the outer surface of the inner metal member and has a pair of opposing ends, an outer surface and an inner surface. The outer metal member is joined to the movable element and has a pair of opposing ends and an outer cylindrical surface. The slip surface is contiguous to the inner or outer surface of the elastomeric member and coextensive therewith.

BRIEF DESCRIPTION OF THE DRAWINGS

Further features and other objects and advantages of this invention will become clear from the following detailed description made with reference to the drawings in which.

DETAILED DESCRIPTION OF THE PREFERRED EMBODIMENTS

Figure 1:
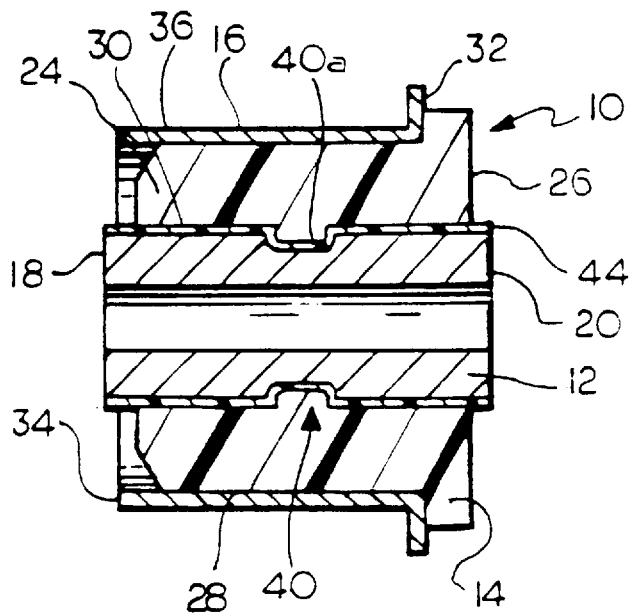
FIG. 1 is a sectional view showing a film slipper bushing assembly in accordance with the present invention.

Referring to the drawings, wherein like reference characters designate like or corresponding parts, FIGS. 1–5 show various embodiments of a film slipper bushing assembly 10 in accordance with the present invention. The various embodiments of the bushing assembly 10 generally include an inner metal member 12, an elastomeric member 14 and an outer metal 16. The inner metal member 12 and outer metal member 16 are concentrically arranged in a spaced apart relationship to one another.

Figure 2:
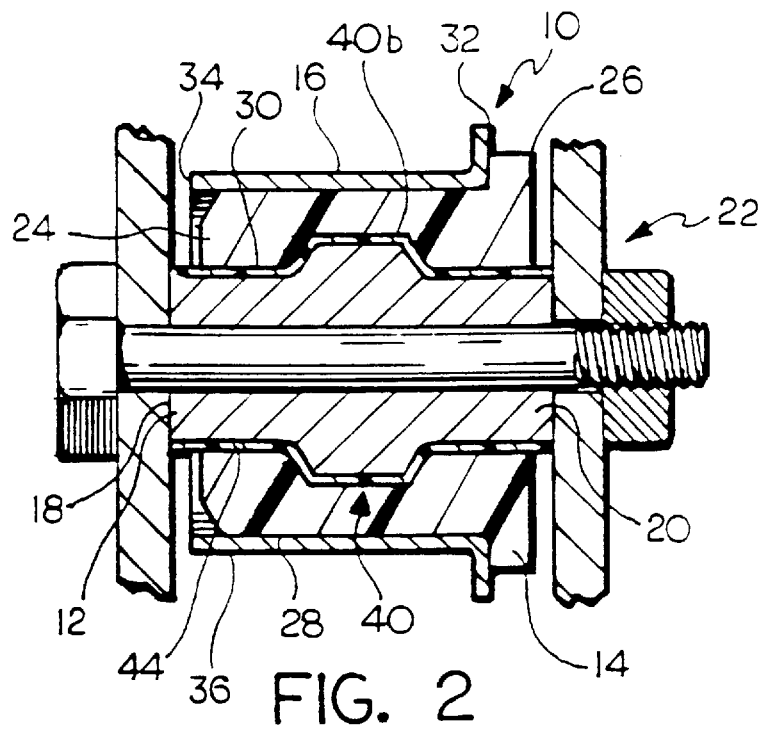
FIG. 2 is a sectional view showing another embodiment of a film slipper bushing assembly in accordance with the present invention.

The inner metal member 12 of the bushing assembly is formed as a rigid one piece member having a pair of opposing ends 18 and 20 and an outer cylindrical surface 22 operatively joined to a support element (not shown). Depending upon the intended application for the bushing assembly 10, the inner metal member 12 may be solid, i.e., rod-like, or the inner metal member may be hollow. For example, as shown in FIG. 2, the inner metal member 12 is a hollow member having an internal diameter of a size to facilitate mounting on the control arm of an automotive suspension system 22, shown in partial cross-section, through a fastener such as a bolt and nut. The inner metal member 12 may be formed from most any suitable material. For example, the inner metal member may be formed of metal such as steel and the like.

The outer metal member 16 of the bushing assembly 10 includes a pair of opposing ends 32 and 34 and a generally outer cylindrical surface 36. The outer metal member 16 is of an internal diameter selected to facilitate mounting on the movable element (not shown) as is well known in the art. The outer metal member 16 is typically formed of a metal such as steel and the like.

Positioned between the inner metal member 12 and the outer metal member 16 is the elastomeric member 14. The elastomeric member 14 is generally formed as a hollow cylindrical member having a pair of opposing ends 24 and 26, an outer surface 28 and an inner surface 30. Typically, the elastomeric member 14 is injection molded between the inner metal member 12 and the outer metal member 16 as further described herein. Accordingly, the internal diameter of the inner surface 30 of the elastomeric member 14 is the same as the outer diameter of the inner metal member 12. The outer diameter of the inner metal member 12 may range from about 0.5–1.0 inches and the outer diameter of the elastomeric member 14 may range from 1.0–2.5 inches. As shown in the figures, in an assembled condition, the elastomeric member 14 encircles a portion of the outer surface of the inner metal member 12. In an optional embodiment, the elastomeric material is injected around the solid slip surface and the inner metal member 12 and then cured. The cured inner metal member 12 is then pressed within the one piece hollow outer metal member 16 to form a slipper bushing.

The bushing assembly 10 may include a means for preventing the inner metal member 12 from disengaging from the elastomeric member 14 and the outer metal member 16.

Figure 4:
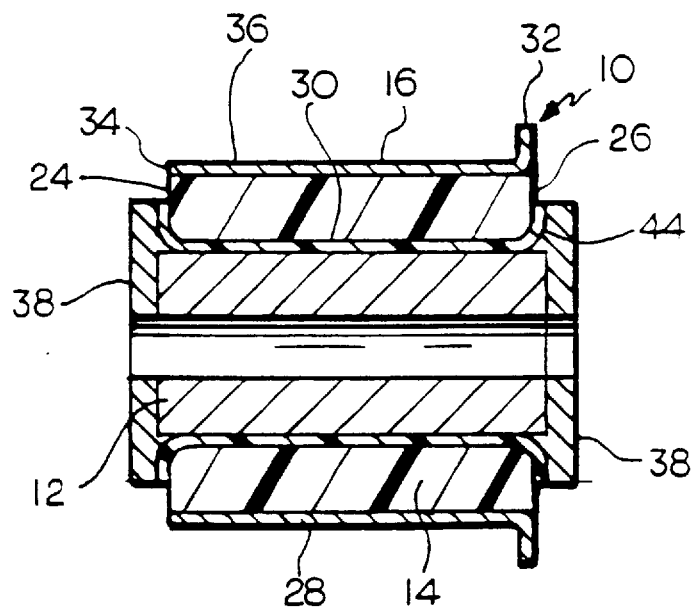
FIG. 4 is a sectional view showing still another embodiment of a film slipper bushing assembly in accordance with the present invention.

As shown in FIG. 4, end caps 38 of a type well known in the art may be fixed to at least one end and preferably both ends of the bushing assembly 10 to prevent excessive axial movement and separation of the inner metal member 12 from the outer metal member 16. The end caps 38 also eliminate or substantially reduce contamination to the interface between the elastomeric member 14 and the outer metal member 16.

In yet another embodiment, the inner metal member 12 may also be prevented from disengaging from the elastomeric member 14 and the outer metal member 16 by utilizing an inner metal member having a profile 40 which inhibits axial motion of the outer metal member relative to the inner metal member while allowing unrestrained rotational motion. The profile 40 may be a circumferential groove 40a formed in the inner metal member (FIG. 1). For ease of manufacture, the circumferential groove 40a may be formed in the inner metal member 12 at the same time as the inner metal member is cut to a desired length from a preformed tubular material in the manufacturing process.

In yet another embodiment, the profile 40 may be a circumferential bulge 40b protruding from the inner metal member 12 (FIG. 2). The circumferential bulge 40b may be formed by roughening a central section of the outer surface of the inner metal member 12 and then injection molding a fiber filled nylon onto the knurled central section of the inner metal member as well known in the art. The plastic nylon may then be made smooth, if necessary, by turning the inner metal member 12 on a lathe and applying a small amount of lubricant such as silicone oil to the circumferential bulge 40b.

Figure 3:
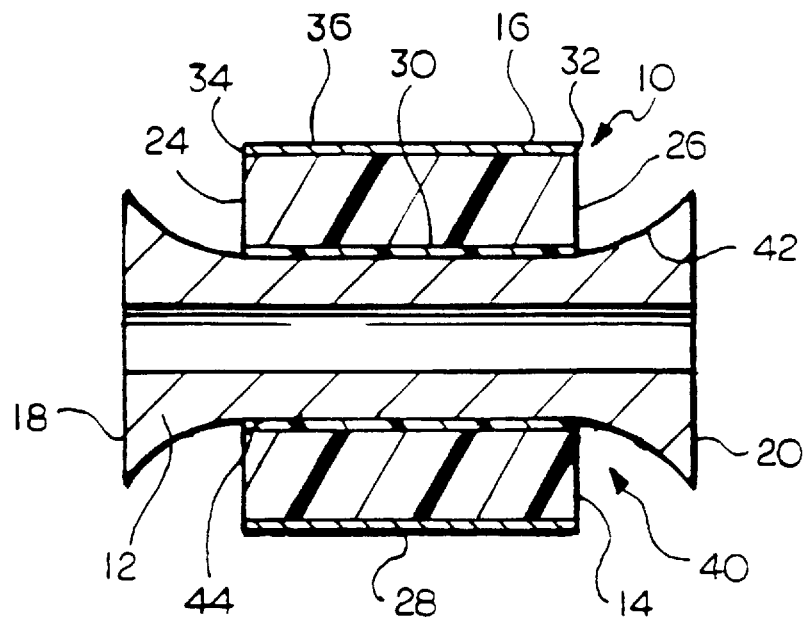
FIG. 3 is a sectional view showing yet another embodiment of a film slipper bushing assembly in accordance with the present invention.

It will be appreciated that most any suitable profile 40 for providing an interference fit, such as those profiles described above, may be utilized for preventing disengagement of the inner metal member 12 from the elastomeric member 14 and the outer metal member. For example, as shown in FIG. 3, the inner metal member 12 may have flared ends 42 which prevent the relative axial movement within the outer metal member 16. The number of circumferential grooves 40a or bulges 40b, the depth or height of the profile 40 and the cross-sectional shape of the profile may all be varied as desired to prevent disengagement of the inner metal member 12 from the elastomeric member 14 and the outer metal member 16. Moreover, the profiles 40 may be formed in the outer metal member 16 instead of the inner metal member 12 and perform as well.

Positioned contiguous to the inner or outer surface of the elastomeric member 14 and coextensive therewith is a solid slip surface 44. The solid slip surface 44 may be formed from most any suitable material to provide a wear resistant, and optionally, reduced friction surface.

The solid slip surface 44 facilitates a sliding action between either the elastomeric member 14 and inner metal member 12 or between the outer metal member 16 and elastomeric member as desired to provide a low torque bushing assembly 10. The solid slip surface 44 also allows for a bushing assembly 10 design capable of controllable torque-displacement characteristics. By selectively changing the clamping force on the bushing assembly 10 the torque-displacement characteristics of the bushing may be changed.

In a preferred embodiment, for ease of assembly, the solid slip surface 44 is formed from a heat shrinkable tubing material. The heat shrinkable tubing material must be a flexible, high temperature resistant material. The heat shrinkable tubing material covers a portion of the inner metal member 12 and is shrink fit around the profile 40 formed within the inner metal member in response to heating. The heat shrinkable tubing material may be a thermoset heat shrinkable polymer material. Suitable materials include cross-linked polyolefins and the like and polyvinylidene fluoride. A suitable cross-linked polyvinylidene fluoride is Kynar (RT-850) commercially available from Raychem. Other suitable materials include RT-555 and RNF-3000, modified fluoropolymers commercially available from Raychem. It will be appreciated that a critical property of the heat shrinkable tubing is that the tubing must be able to withstand the shearing effect from the flow of rubber during mold filling at elevated temperatures.

The heat shrinkable tubing material may be slid over the inner metal member 12 and, preferably, extend past each end of the inner metal member 12. The inner metal member 12 and heat shrinkable tubing material may then be heated for a sufficient period of time to shrink the tubing onto the inner metal member. After the tubing material is heat shrunk around the inner metal member 12, the periphery of the tubing material may be trimmed from the edge of the inner metal member 12.

The inner metal member 12 and outer metal member 16 are positioned within cavities within a multi-cavity mold (not shown) of a type well known in the art and elastomeric material is injection molded around the heat shrinkable tubing material through a runner system. To ensure adhesion, the inner surface of the outer metal member 16 and the outer surface of the slip surface 44 may be coated with an adhesive. Suitable adhesives that may be used to bond the rubber to the slip surface are Chemloc 205 and 236 commercially available from Lord Corporation. The filled mold cavities may then be cured after which the formed slipper bushing assembly 10 is ejected from the mold by applying force to the inner and outer metal members 12 and 16.

In yet another embodiment, the solid slip surface 44 may be formed of an ultra high molecular weight polyethylene film such as the film prepared by geltrusion and sold under the name Soluflex from DSM. The ultra high molecular weight polyethylene film has a weight average molecular weight between 3,000,000 and 6,000,000.

The slipper bushing assembly 10 having this polyethylene film may be prepared by wrapping the ultra high molecular weight polyethylene film with a slight overlap around the circumference of the preformed inner metal member 12. The inner metal member 12 is then placed in an aluminum compression mold (not shown) consisting of a central cylindrical cavity connected axially between two smaller cylindrical shaped cavities into which the inner metal member is placed. This split mold consists of two similarly shaped halves with a lengthwise parting line. Pieces of the elastomeric material are then placed in the central cavity of the mold and compression molded between the film and the outer surface of the central cavity. The ultra high molecular weight polyethylene film is preferably slightly longer than the central mold cavity so that the ends of the film may be clamped between the inner metal member 12 and the mold halves thereby holding the film in place as rubber flows into the mold. To ensure adhesion, the inner surface of the outer metal member 16 and the outer surface of the slip surface 44 may be coated with an adhesive as previously described.

Figure 5:
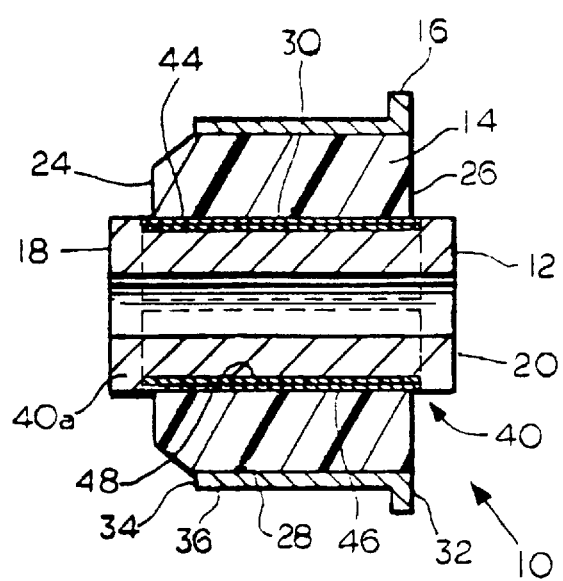
FIG. 5 is a sectional view showing another embodiment of a film slipper bushing assembly in accordance with the present invention.

In yet another embodiment, as shown in FIG. 5 the solid slip surface 44 may include a split metal member annular sleeve 46 having a polymer inner surface 48. The polymer inner surface 48 may be tetrafluoroethylene. The solid slip surface 44 is configured to fit within a corresponding groove 40a formed within the outer surface of the inner metal member 12. The annular sleeve 46 is retained within the groove 40a such that the annular sleeve can rotate around the inner metal member 12 but axial movement is restrained by the marginal edges defining the groove 40a. The elastomeric member 14 is bonded to the inner surface of the outer metal member 16 to maintain the integrity of the bushing assembly 10 using a suitable adhesive of a type as previously described.

The invention will be further clarified by a consideration of the following examples, which are intended to be purely exemplary of the invention.

EXAMPLE 1

A film slipper bushing in accordance with FIG. 2 was made by first cutting to length a piece of tubular steel of the desired diameter to form the inner metal member 12. For ease of assembly, the inner metal member 12 was slid over a vertically secured support shaft. The support shaft has a cylindrical spacer at the lower end thereof of about the same outer diameter as the outer diameter of the inner metal member 12. A second cylindrical spacer having about the same outer diameter as the outer diameter of the inner metal member 12 was then slid onto the support shaft and against the top of the inner metal member. It will be appreciated that the spacers allow the heat shrinkable tubing material to slide smoothly toward the center of the inner metal member 12 during shrinking rather than folding over the ends of the inner metal member thereby preventing the formation of air pockets. A protrusion may also be formed on the lower spacer to prevent the tubing material from sliding off of the inner metal member.

A precut portion of a heat shrinkable tubing material was then slid over the inner metal 12. The heat shrinkable tubing material extended approximately ¼ inch over each end of the inner metal member 12 and onto the spacers. The assembled support shaft, spacers, inner metal member 12 and heat shrinkable tubing material were then placed into a preheated oven at a temperature of approximately 400 degrees Fahrenheit for a time necessary to shrink the tubing about the inner metal member, e.g., about 20 minutes.

After the heat shrinkable tubing material shrunk, the support shaft was removed from the oven and cooled. The periphery of the tubing material was trimmed from the edge of the inner metal member 12 approximately ⅛ inch to allow sufficient room to position the inner metal member in a mold to form the elastomeric member 14 around the inner metal member as previously described. To ensure adhesion, the inner surface of the outer metal member 16 and the outer surface of the slip surface 44 were, at times, coated with Chemloc 205 and 236 from Lord Corporation. The metal members were placed in an injection mold which was then closed and the mold cavities injected with heated and masticated rubber under pressure through a runner system of a type well known in the art. The rubber was heated to approximately 270 degrees Fahrenheit and the mold temperature was maintained at approximately 329 degrees Fahrenheit. The rubber in the filled mold cavities was then cured and the formed slipper bushing assembly 10 was ejected from the molds by applying force simultaneously to the inner and outer metal members 12 and 16 to avoid damaging the bushing assembly 10.

EXAMPLE 2

The fatigue life of the film slipper bushing assembly 10 formed by compression molding around an ultra high molecular weight polyethylene film was tested using a biaxial test machine of a type well known in the art by rotating the bushing through +/−15 degree angular rotations for 159,000 cycles under no load and an additional 3,115,000 cycles under a 45-lb preload. After completing 3,274,000 cycles the film slipper bushing assembly 10 was removed from the biaxial test machine and the film surface was visually inspected. The film surface showed only slight wear after testing.

EXAMPLE 3

The torque characteristics of the bushing assembly 10 of Example 2 were also examined in response to various clamping force levels. To test the torque characteristics of the bushing assembly 10, the bushing was placed in an adjustable clamp and the inward radial force of the clamp on the outer rubber surface was adjusted by tightening the clamp to various clamping force values as indicated by a torque wrench setting. A plot was then made of the torque-angle response for the film, at the lowest clamp force (cf) value, corresponding to a 1 in-lb wrench setting. It was determined that the slip characteristics of the bushing assembly 10 were typical of coulomb friction (constant breaking torque over a range of angles) and a short duration viscoelastic response when the displacement changed direction. At the highest cf values of 60 in-lb, the breaking torque was so high that the bushing response was almost completely viscoelastic.

It will be appreciated from the foregoing that the response of a bushing assembly 10 in accordance with the present invention may be adjusted to provide a desired response characteristics varying between a slip response to a nonslip response such that the bushing may be calibrated to particular settings prior to installation on a vehicle or, in the alternative, operated in a semi-active mode by selectively adjusting friction during operation.

Having described presently preferred embodiments of the invention, it is to be understood that it may be otherwise embodied within the scope of the appended claims.

What is claimed is:

1. A slipper bushing assembly including a series of concentric members for permitting controlled sliding movement between a support element and a movable element, the slipper bushing assembly comprising;

a) a rigid one piece inner metal member adapted to be joined to the support element, said inner metal member having a pair of opposing ends and an outer cylindrical surface;

b) a hollow cylindrical elastomeric member encircling said outer surface of said inner metal member and having a pair of opposing ends, an outer surface and an inner surface;

c) a rigid, one piece hollow outer metal member adapted to be joined to the movable element, said outer metal member having a pair of opposing ends and an outer cylindrical surface;

d) a solid slip surface contiguous with said elastomeric member and coextensive therewith allowing circumferential movement of said inner metal member with respect to said outer metal member; and e) means for preventing said inner metal member from disengaging from said outer metal member;

wherein said solid slip surface includes a split metal annular sleeve having a polymer inner surface, said solid slip surface configured to fit within a groove formed within the outer surface of the inner metal member.

2. The slipper bushing assembly of claim 1 wherein said polymer inner surface is formed of polytetrafluoroethylene.

* * * * *